Figures 1, 2:
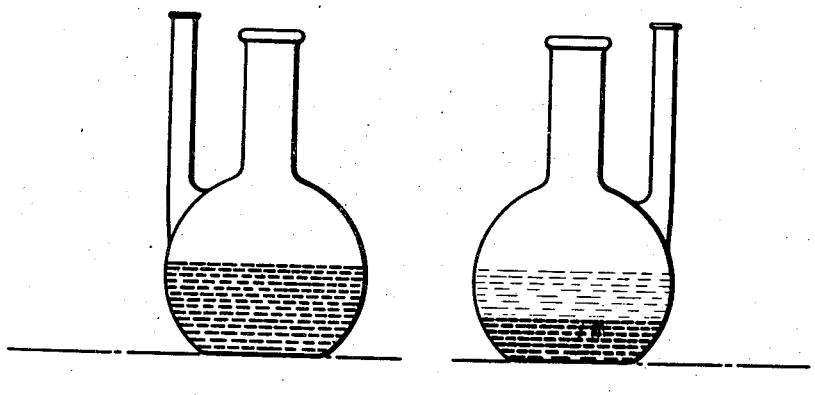

Oct. 13, 1942.     L. D. MYERS ET AL     2,298,501
METHOD OF SEPARATING FATTY ACIDS
Filed Jan. 20, 1942

INVENTOR.
BY Latimer D. Myers
Victor J. Muckerheide
Mord, Arey, Hamsen & Evans
Attorneys.

Patented Oct. 13, 1942

2,298,501

UNITED STATES PATENT OFFICE 2,298,501

METHOD OF SEPARATING FATTY ACIDS

Latimer D. Myers, Cincinnati, and Victor J. Muckerheide, Silverton, Ohio, assignors to Emery Industries, Inc., Cincinnati, Ohio, a corporation of Ohio Application January 20, 1942, Serial No. 427,491

10 Claims. (Cl. 260—419)

The invention relates to a method of separating mixed higher fatty acids one from another. This method is of particular utility for treating fatty acid stocks of the type which is used to obtain the stearic and oleic acids of commerce. These products are produced from materials such as tallow, brown grease, garbage grease, and the like; and they are termed animal fatty acids, the term denoting their origin to distinguish them from fatty acids derived from vegetable sources. The present application is a continuation-in-part of our application Serial No. 348,246, filed July 29, 1940, entitled "Method of separating fatty acids."

In the aforesaid copending patent application processes are disclosed for separating stearic acid and palmitic acid from one another and also for separating the red oil of the oleic acid from the solid acid bodies. The present invention is directed particularly to an improvement upon the process by which the separation of such fatty acid components from one another is facilitated.

Oleic acid is a liquid, sometimes called red oil. Commercial stearic acid is a waxy solid. While the solid acid component of animal fatty acid is termed stearic, it is in fact comprised predominantly of stearic acid and palmitic acid, and these two components are present in typical animal fatty acids in a characteristic ratio, approximating what is commonly termed the eutectic mixture, 52.5% of palmitic and 47.5% of stearic acid, although the exact ratio varies somewhat with each specific stock. In the past, it has been impossible to separate the stearic and palmitic acids from one another, and the primary products of the fatty acid industry have, therefore, been glycerine, oleic, or red oil, and commercial stearic acid.

In the manufacture of commercial stearic acid in the past, the natural fats are chosen and blended to constitute a batch in which the solid fatty acids will have a ratio of 47.5% stearic acid to 52.5% palmitic acid, the reason for maintaining this eutectic ratio subsequently is explained. After blending or selection, the fats are split into fatty acids and separated from the glycerine water. In many cases the fatty acids are then distilled to improve color and purity. Next, the mixed fatty acids are poured into pans to solidify, and are then chilled to approximately 40° F. The cakes so formed are wrapped in burlap, and pressed in large hydraulic presses. This operation removes a substantial percentage of the oleic acid, but by no means all of it, due to mechanical entrainment and collapse of the cake. These cakes are remelted, recast and pressed a second time at an elevated temperature, such as 100° F., to remove additional oleic acid. This is called the hot pressing operation to distinguish it from the first pressing operation which is known as cold pressing.

At the temperature of the hot pressing operation, the solid fatty acids are soluble in the red oil, and so the red oil fraction from the hot pressing operation contains too high a percentage of solid fatty acids to be used for the purpose for which red oil is normally desired. This hot press red oil, therefore, must be reworked by further treatments or reincorporation with new batches of mixed fatty acids before it can become a useful commercial product.

If the indicated ratio of stearic to palmitic acid be not observed, the mixed fatty acids do not form the best crystal structure upon chilling, and it is difficult to separate the red oil from the solid acid components. On this account, very little latitude is permissible, either in respect to the fats chosen to be processed, or in the composition of the ultimate products.

The commercial process just described is slow and expensive, and requires careful control and selection of the initial raw material to provide a balance which, ultimately, may not be desirable in the final product. Moreover, the number of raw fats and oils which may be combined or blended to provide the eutectic mixture is very limited. The process and the attendant commercial conditions, which have just been described, have existed for a period exceeding fifty years, and, outside of the development of the Twitchell fat splitting reagent, there has been little or no progress in the industry despite the urgent need for fatty acid fractions different from commercial stearic.

The invention disclosed in the aforesaid copending application consists in separating the solid fatty acids from the oleic acid by means of a solvent and in producing a very low titre oleic acid. We have also discovered that it is possible to fractionate the solid fatty acids in the course of separating them from the liquid fatty acids by dissolving the mixed fatty acids in a solvent, then crystallizing the solid acids and separating them from the liquid acids in two or more steps at progressively lower temperatures. By this method, it is possible to obtain solid fatty acid fractions, higher in stearic acid than palmitic acid, and other fatty acid fractions higher in palmitic acid than in stearic acid, and different from eutectic mixes. As many steps as desired may be employed and a corresponding number of fractions recovered, the oleic acid remaining in the solvent.

Though it has been known for fifty years or more that a separation of solid and liquid fatty acids could be made, at least approximately, by a method of this type, still the practical art has pursued universally the still older method of effecting the separation by pressing operations. Our investigation indicates that one reason for the inapplicability of the proposed solvent separation process to commercial production has resided in the difficulty of obtaining crystals of solid acids susceptible to being filtered and washed in large scale production. We have determined that in order to obtain a substantially zero titre red oil, and useful solid acid components, it is desirable to use a polar type of solvent which is water miscible, such as methyl alcohol, ethyl alcohol, isopropyl alcohol, acetone, etc., that the water content of the solvent should not substantially exceed 15% by weight, and that the concentration of the fatty acids in the solvent should not materially or substantially exceed 30% by weight. If the concentration of fatty acids in solvent be too high, then the solid acid crystals tend to form a slimy mass which cannot be handled or washed except perhaps in small quantities under laboratory conditions.

Briefly, we have discovered that the presence of a relatively small quantity of neutral fat in the solvent solution which is to be fractionated by crystallization promotes the formation of crystals which have good filtering characteristics. The amount of neutral fat should not exceed approximately 3½% by weight and preferably should be around ½ of 1%.

If the amount of neutral fat present in or added to the solvent solution of fatty acid to be fractionated exceeds about 3½% either or both of two undesirable effects are likely to be encountered. On the one hand, an excessive amount of neutral fat tends to prevent fractionation or separation of one solid fatty acid from another, that is, the successive batches of crystals precipitated from the solvent solution are of the same or substantially the same chemical identity so that no useful separation of components of different identity is accomplished. On the other hand, the presence of an excessive amount of neutral fat causes the size of the crystals to become so large that, although such crystals are relatively easy to filter, liquid fatty acids are enveloped or occluded with them and the liquid fatty acids, notably oleic acids, are present to contaminate the solid fatty acid of the crystal structure. This difficulty of contamination usually is encountered before actual fractionation of the fatty acids becomes impossible.

The improvement, therefore, to which the present application is directed is the process of facilitating the formation of crystals having good filtering characteristics and readily adapted to be washed with solvent, and it is predicated upon the discovery that the presence of a limited amount of neutral fat in the solvent solution of fatty acids to be fractionated enables this result to be obtained.

The neutral fat selected for use is preferably of the same general character as the fatty acids being treated. Thus, if fatty acids from tallow are being separated then tallow, itself, is selected as the neutral stock. The neutral fat comes out of the solid solution with the solid acid usually in the first fractionation step. For this reason it is sometimes desirable to add some neutral fat to the second fractionation stock solution.

In some cases the indicated amount of neutral fat may actually be present in the distilled fatty acids which are to be treated and in this case, of course, additions of neutral fat are not required. It is also to be noted that in some cases the neutral fat content of a fatty acid stock may actually exceed about 3½% by weight. In such event the chemical consistency of the stock is best modified before fractionation is attempted by the addition of a suitable quantity of fatty acid devoid of neutral fat, that is, in such event fatty acid free of neutral fat is added to reduce, by dilution, the free fat content of the material to be treated.

The reasons accounting for the fact that the presence of a limited quantity of neutral fat will facilitate fractionation of fatty acids from one another and the presence of a greater amount will actually impede fractionation are not fully understood. It is believed from the evidence which is available at present that the neutral fat provides foci at which fatty acid crystals are formed. When the amount of neutral fat is excessive ball-like crystals are formed and liquid fatty acids are sequestered in these crystal structures. The presence of such ball-like crystals serves therefore as a practical guide indicating that the quantity of neutral fat is excessive. When such crystals are formed the fractionation of one fatty acid from another becomes difficult if not impossible in that if these crystals are redissolved and the solution refractionated crystals of a similar if not identical chemical consistency are then obtained.

The drawing illustrates, by visual comparison, the improvement in results which is obtained by treating fatty acid stocks in accordance with the process of the present invention.

Figure 1 of the drawing represents a fatty acid-solvent solution having poor filtering characteristics; for example, the solution may consist of a thirty percent concentration of a still stock dissolved in 90% methanol and cooled to 24° C. When such a mixture is permitted to settle for about ten minutes, it will be seen that no substantial physical separation of the fatty acid fraction from the solution is visible. The crystals are very fine and tend to remain in suspended condition in the solution at the given temperature. Such a solution is very difficult to filter.

Figure 2 represents a solution of the same concentration in the same solvent at the same temperature and likewise permitted to settle for ten minutes. The stock in this case, however, has been treated with neutral fat in accordance with the present invention. It will be seen that the solution shown in Figure 2 has settled rapidly and thereby separated from the solvent solution. Such a mixture has very good filtering characteristics.

This comparison test, as represented in Figures 1 and 2, is useful as a guide in the practical application of the process of this invention. If a stock having poor filtering characteristics is encountered it is then treated with a small amount of neutral fat, say, .3% by weight, whereupon its temperature is reduced and it is permitted to stand a given length of time, say, ten minutes. Several such tests using varying amounts of added neutral fat can be run simultaneously and the sample showing the most favorable conditions then designates the quantity of neutral fat which it is desirable to add to the batch to be run commercially.

It will be understood that the control over the neutral fat content of the solvent solutions of fatty acids is desirably employed in conjunction with the other controls set forth in the aforesaid copending application, which for convenience are repeated in detail here:

In order to apply the principle of solvent separation to commercial production of the animal fatty acids, it is requisite that the total amount of solvent employed in conducting the operation be not so great that its initial cost, its loss, its recovery costs and general handling will elevate the cost of the process above that of the presently utilized pressing methods. We have determined that it is feasible and practical, commercially, in large scale operations, to remove the solid from the liquid fatty acids by utilizing a concentration of acids in solvent of substantially 20 to 30% and by maintaining the strength of the solvent at 85% to 95%. These conditions provide a superior oleic acid, inhibit the entrainment of an undue quantity of oleic acid in the solid precipitate, and produce solid fatty acids suitable for various commercial use.

The invention also comprises the fractionating of the solid fatty acids. Though this may be done where desired, apart from and independently of the solid and liquid fatty acid separation, still it is advantageous in many respects to perform the two operations conjointly. In order to do this, the solution is first chilled below the precipitating point of stearic acid, the first precipitate is filtered and washed, and then the solution is further chilled and the precipitate again filtered. In this manner, any desired number of fractions may be obtained.

The degree of each drop of temperature is determined by the end products desired. Fractions tending to be higher in stearic come out of solution first, and the fractions higher in palmitic at the lower temperatures.

In general, the fractions dominately high in palmitic are more difficult to wash because of a tendency of them to entrain oleic acid. Such fractions are particularly suitable for soap making stocks because of the great tendency to lather in soaps made from palmitic acid. Where greater purity is desired, these fractions high in palmitic may be recrystallized from solution to reduce their content of oleic acid.

Typical examples of the practice of this process are as follows:

*Example 1*

Distilled fatty acids obtained from a blend of 90% tallow and 10% garbage grease were dissolved in 90% methanol, the concentration being 25%. Upon slowly cooling the solution precipitation of the solid acids occurred. The precipitate was slimy, showed no tendency to settle and filtered very poorly at about 20 in. vacuum.

One quarter of one percent tallow was added to the fatty acids. Using the same concentrations and method of cooling a granular precipitate was obtained which settled in 5 minutes to the extent that half of the slurry consisted of clear liquid. This slurry filtered rapidly at a 10 in. vacuum yielding a dry powdery cake.

*Example 2*

Processing fatty acids at the rate of 1800# per hour at 30% concentration using fatty acids obtained from a blend of 90% tallow and 10% garbage grease without the addition of tallow and utilizing a two stage operation the first fraction obtained by cooling to 52° F. filtered poorly with high vacuums and a titre of 129.3.

After adding .3% neutral fat to the stock a granular slurry, having good filtering characteristics, was obtained. The filtering, washing, and solvent removal vacuums ranged from 5 to 9 inches and the titre of the first fraction solid acids had a titre of 130.7.

The corresponding second fractions showed titre of 124.2 without tallow addition as compared to 127.2 with .3% tallow.

Having described our invention, we claim:

1. The method of conditioning a fatty acid stock to promote the formation of crystals having good filtering characteristics in a solvent solution of the stock cooled to a predetermined temperature, which method comprises adding neutral fat to the stock in such amount that the total neutral fat content of the stock resides within the range of from approximately .2% to approximately 3½%.

2. The method of conditioning a fatty acid stock to promote the formation of crystals having good filtering characteristics in a solvent solution of the stock cooled to a predetermined temperature, which method comprises adjusting the neutral fat content of the stock until it resides within the range of from approximately .2% based on the weight of the stock to 3½%.

3. The method of conditioning a fatty acid stock to promote the formation of crystals having good filtering characteristics in a solvent solution of the stock cooled to a predetermined temperature, which method comprises determining the neutral fat content of the stock and adding neutral fat to the stock if its neutral fat content is less than approximately .2% by weight but controlling the amount added so that the neutral fat content thereafter does not exceed 3½%, and adding fatty acid substantially free of neutral fat to the stock if its neutral fat content exceeds 3½%, but controlling the amount of fatty acids added so that the neutral fat content of the stock thereafter is less than 3½% by weight but more than .2%.

4. In the art which comprises separating a fatty acid fraction from a solvent solution containing mixed fatty acids dissolved therein, the step which comprises establishing a neutral fat content of from approximately ½ to 3½% of neutral fat in said solvent solution before effecting precipitation of the given fraction of fatty acids from said solution.

5. The method of obtaining quasi-pure individual fatty acids from mixed fatty acids, which comprises dissolving mixed fatty acids in a solvent with which water is inherently miscible and which contains water, and which solvent also contains a quantity of neutral fat which is approximately ½ to 3½% of the weight of the mixed fatty acids dissolved therein, then chilling said solution to a degree sufficient to cause crystallization of a dominant portion of one of the fatty acids in solution and removing the fatty acid body so crystallized from the solution.

6. The method of accomplishing the approximate separation of mixed fatty acids, which method comprises forming a solution of mixed fatty acids in a solvent and establishing in the solution a neutral fat content of approximately ½ to 3½% based on the weight of the mixed fatty acids contained therein, then chilling the said solution to precipitate a fatty acid fraction therefrom and separating the precipitated fraction from the solvent solution.

7. The method of promoting the formation of fatty acid crystals having good filtering characteristics from a solvent solution in which mixed fatty acids are dissolved, which comprises establishing an amount of neutral fat in said solution containing said mixed fatty acids which is from approximately ½ to 3½% by weight of the mixed fatty acids therein, and then chilling the said solution to reduce its solvent capacity for a given fraction of said fatty acids to cause said fraction to precipitate from said solution.

8. The method of separating mixed fatty acids of the type exemplified by those obtained from animal fat, said method comprising preparing a solution of mixed fatty acids in a solvent of the polar type and providing in said solution a limited amount of neutral fat, then chilling said solution to reduce its solvent capacity for a given fraction of the fatty acids contained therein thereby precipitating the said given fraction of the fatty acids and separating the precipitated fatty acids from the solvent solution containing unprecipitated fatty acids.

9. The method of obtaining a fatty acid fraction relatively rich in stearic and palmitic acids from a mixture of the same derived from animal fat, said method comprising dissolving the mixture in a solvent of the polar type and establishing in said solvent solution a neutral fat content which is sufficient to promote the formation of crystals having good filtering characteristics but insufficient to impede fractionation, then chilling the solution to a degree sufficient to crystallize a fatty acid fraction therefrom which is higher in stearic acid than the starting mixture, filtering said precipitate and removing said precipitate from said solvent solution.

10. The method of obtaining fatty acid fractions relatively rich in stearic and palmitic acids from mixtures of the same derived from animal fat, said method comprising dissolving said mixtures in a solvent of the polar type and establishing in said solvent solution a quantity of neutral fat amounting to approximately ½ to 3½% of the weight of the fatty acids in admixture in the solution, then chilling the solution a first time an amount sufficient to provide a fraction substantially purer in stearic than in palmitic acid and removing said fraction by filtration, chilling the solution a second time an amount sufficient to effect crystallization of a eutectic mixture of stearic and palmitic acids and removing the said fraction from the solvent solution by filtration, and chilling the solution a third time an amount sufficient to precipitate a fraction substantially richer in palmitic acid than in stearic acid and removing said third fraction by filtration.

LATIMER D. MYERS.
VICTOR J. MUCKERHEIDE.